United States Patent [19]

Jobe et al.

[11] Patent Number: 4,801,699

[45] Date of Patent: Jan. 31, 1989

[54] POLYSACCHARIDE ESTERS CONTAINING ACETAL AND ALDEHYDE GROUPS

[75] Inventors: Patrick G. Jobe, Westfield, N.J.; Diane J. Lamb, Lincoln, Nebr.; Gary T. Martino, Dayton, N.J.

[73] Assignee: National Starch and Chemical Corporation, Bridgewater, N.J.

[21] Appl. No.: 23,177

[22] Filed: Mar. 9, 1987

[51] Int. Cl.$^4$ .............................. C08G 18/10
[52] U.S. Cl. .......................... 536/59; 536/32; 536/33; 536/48; 536/52; 536/102; 536/107; 536/114
[58] Field of Search ............ 536/32, 33, 48, 52, 536/102, 107, 114; 537/59

[56] References Cited

U.S. PATENT DOCUMENTS

| | | | |
|---|---|---|---|
| 2,803,558 | 8/1957 | Fronmuller | 106/205 |
| 3,062,652 | 11/1962 | Jeffreys et al. | 96/99 |
| 3,086,969 | 4/1963 | Slager | 260/209 |
| 3,519,618 | 7/1970 | Parmerier | 260/233.3 |
| 3,553,193 | 1/1971 | Le Roy et al. | 260/233.3 |
| 3,632,802 | 1/1972 | BeMiller et al. | 260/233.3 R |
| 3,728,332 | 4/1973 | Tessler et al. | 260/233.5 |
| 3,740,391 | 6/1973 | Williams et al. | 260/233.3 R |
| 4,447,294 | 5/1984 | Osborn, III | 162/158 |
| 4,508,594 | 4/1985 | Jansma et al. | 162/135 |
| 4,675,394 | 6/1987 | Solarek et al. | 536/43 |

*Primary Examiner*—Joseph L. Schofer
*Assistant Examiner*—Peter D. Mulcahy

*Attorney, Agent, or Firm*—Margaret B. Kelley; Edwin M. Szala

[57] ABSTRACT

Polysaccharide esters containing aldehyde and acetal groups having the structural formulas

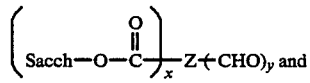 and

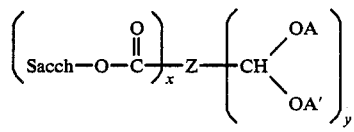

are prepared by reacting a polysaccharide, such as a starch, gum, or cellulose, with an acetal-containing reagent which contains a functional group reactive with the hydroxyl groups of the polysaccharide; Z is a multivalent organic group; A and A' are independently a lower alkyl or together form at least a 5-membered cyclic acetal; x is at least 1; and y is at least 1. When x is >1 the esters are corsslinked. Typical reagents for introducing the acetal group include 3,3-diethoxypropionyl guanidine (itself a novel compound) and 4-(methylaminoacetaldehyde dimethyl acetal)-4-oxobutanoic acid). The derivatives are useful in conventional applications such as coatings, adhesives, paper additives and foodstuffs.

9 Claims, No Drawings

POLYSACCHARIDE ESTERS CONTAINING ACETAL AND ALDEHYDE GROUPS

BACKGROUND OF THE INVENTION

This invention relates to polysaccharide esters containing aldehyde groups, to their preparation from the corresponding acetals, and to a guanidine derivative used for the preparation of one of the acetals. It also relates to the use of the aldehydes as wet strength agents in paper.

As used herein, the term "paper" includes sheet-like masses and molded products made from fibrous cellulosic materials which may be derived from natural sources as well as from synthetics such as polyamides, polyesters, and polyacrylic resins, and from material fibers such as asbestos and glass. In addition, papers, made from combinations of cellulosic and synthetic materials are applicable herein. Paperboard is also included within the term "paper".

Oxidative and non-oxidative methods have been used to introduce aldehyde groups into polysaccharides such as starches, gums, and celluloses. The oxidative methods used have included treatment with periodic and, periodates, or alkali metal ferrates. See U.S. Pat. No. 3,086,969 (issued Apr. 23, 1963 to J. E. Slager) which discloses an improved process for the preparation of a dialdehyde polysaccharide, (e.g., starch) using periodic acid; U.S. Pat. No. 3,062,652 (issue Nov. 6, 1962 to R. A. Jeffreys et al.) which discloses the preparation of dialdehyde gums (e.g., gum acacia, pectin, and guar) using periodate or periodic acid; and U.S. Pat. No. 3,632,802 (issued Jan. 4, 1972 to J. N. BeMiller et al.) which discloses a method for oxidizing a carbohydrate, (e.g., starch or cellulose) with an alkali metal ferrate, which selectively oxidizes the primary alcohol group on the side chains without ring cleavage or oxidation of the ring hydroxyls.

The disadvantages of the oxidative method include degradation to lower molecular weight products and the formation of carboxyl groups due to further oxidation of the aldehyde groups. U.S. Pat. No. 3,553,193 (issued Jan. 5, 1973 to D. H. LeRoy et al.) describes an improved method for oxidizing starch using an alkali metal bromite or hypobromite under carefully controlled conditions, which reportedly results in a substantially greater proportion of carbonyl groups (i.e., aldehyde groups) than carboxyl groups.

The non-oxidative methods typically involve the reaction of the polysaccharide with an aldehyde-containing reagent. See U.S. Pat. No. 3,519,618 (issued July 7, 1970 to S. M. Parmerter) and U.S. Pat. No. 3,740,391 (issued June 19, 1973 to L. L. Williams et al.) which cover starch ether derivatives and U.S. Pat. No. 2,803,558 (issued Aug. 20, 1957 to G. D. Fronmuller) which covers a gum ether derivative. Water-soluble cellulose ethers (e.g., hydroxyethylcellulose) have also been reacted with glyoxal or urea formaldehyde to give aldehyde-containing derivatives.

One of the disadvantages of introducing the aldehyde groups directly using an aldehyde-containing reagent is the possibility of the derivative reacting prior to use, e.g., crosslinking. This is a particular disadvantage when the products are being used to impart temporary wet strength to paper via a crosslinking reaction with the cellulose fibers. This prior reaction of the aldehyde functionality is also a problem when preparing crosslinked products in that it makes control of the final degree of crosslinking very difficult or impossible and it leads to a decrease in the amount of aldehyde functionality in the final product.

The preparation of stach esters from acyl guanidines is disclosed in U.S. Pat. No. 3,728,332 issued Apr. 17, 1973 to M. M. Tessler et al. The acylguanidines used do not contain acetal groups.

A method for introducing aldehyde groups into polysaccharides is described in U.S. Pat. No. 4,675,394 issued June 23, 1987 to Daniel B. Solarek et al. The first step involves the reaction of the polysaccharide with a reagent containing an acetal-functionality and an additional group reactive with the polysaccharide to form an ether linkage. The second step involves conversion of the acetal to the aldehyde at a pH of 7 or less. The etherification reaction must be carried out under alkaline conditions (e.g., pH of >7). Under these conditions other substituents present on the polysaccharide (e.g., ester, carbonyl, or epoxide) may be unstable and hence removed.

Therefore, there is a need for aldehyde-containing polysaccharides, particularly for a method for preparing them in the presence of alkalilabile substituent groups.

SUMMARY OF THE INVENTION

The present invention provides polysaccharide esters containing an aldehyde functionality in the ester substituent, which have the structure

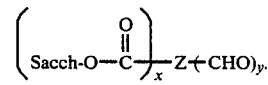

It also provides polysaccharide esters containing an acetal functionality in the ester substituent, which have the structure

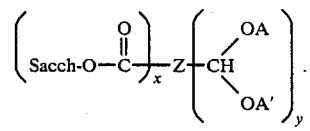

It further provides a 3,3-dialkoxy propionyl guanidine having the structure

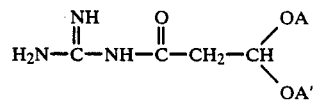

In the above formulas Sacch-O- represents a polysaccharide molecule (wherein in the hydrogen of a hydroxyl group of a saccharide unit has been replaced as shown); Z is a multivalent organic group, typically a divalent group, optionally containing substituents such as an alkyl (R) or substituted alkyl group, ether ($OR^1$), carbonyl (CO), halide (X), ester ($COOR^1$), amide ($CONR^1R^2$), amine ($NR^1R^2$), amine ($N^+R^1R^2R^3$), thioalkyl ($SR^1$), sulfonate ($SO_3R^1$), sulfate ($SO_4R^1$) or other monovalent organic functional group, even one containing other acetal functionalities; $R^1$, $R^2$, and $R^3$ are hydrogen or a monovalent organic group, typically a lower alkyl group ($C_1$–$C_6$); X is a halogen; A and A' are independently a lower alkyl or A and A' together form at least a 5-membered cyclic acetal; x is at least 1; and y is at least 1.

When x is 2 and y is 1, the polysaccharide ester will be crosslinked and have the structure

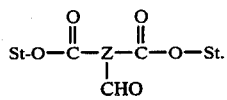

When x is 1 and y is 2, the polysaccharide ester will contain two aldehyde groups and have the structure

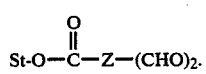

When x is 2 and y is 2, the polysaccharide ester will contain two aldehyde groups, be crosslinked, and have the structure

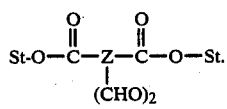

When x is 1, there is very little or no additional crosslinking of the product during the manufacturing process. Such products are useful in applications where good dispersibility or solubility are important and where careful control of crosslinking is necessary. When x is >1, the product contains additional crosslinks which provide a means for modifying the physical and solution properties of the polymers. Such crosslinking is important in many applications, e.g., in the preparation of water-resistant adhesives or coatings or foods with a modified texture.

The polysaccharide molecule may be modified by the introduction of cationic, anionic, nonionic, amphoteric, and/or and zwitterionic substituent groups. As used herein, the terms "cationic" and "anionic" are intended to cover cationogenic and anionogenic groups.

The acetals are prepared by reacting the polysaccharide with an acetal reagent having the general structure

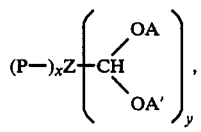

where Z is defined as above and P is a group capable of reacting with a hydroxyl group of the polysaccharide to form an ester linkage. Suitable groups include activated acyl groups (e.g., acid chlorides, imidazoliums, isocyanates, anhydrides, and vinyl esters) and non-activated acyl groups (e.g., acids, acid salts, and esters). Typical reagents have the formula

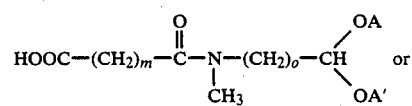 or

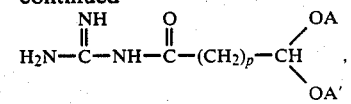

where A and A' are the same or different and are lower alkyls, preferably methyl and ethyl, and m, o, and p are 1–3, preferably 1.

The aldehydes are prepared by hydrolyzing the corresponding acetal at a pH of less than 7, preferably 5 or less, most preferably 2–3. It is surprising that the ester group is not cleaved by the conversion of the acetal. As will be shown in the following examples, the ester linkage is stable even at a pH as low as 1.8.

The aldehyde and acetal derivatives are useful in conventional applications where water-soluble, water-swellable, or crosslinked polysaccharide derivatives are useful, for example, as coatings, adhesives, paper additives, and foodstuffs. The non-crosslinked, cationic aldehyde-containing derivatives are particularly useful as paper additives, e.g., as temporary wet strength additives in tissue/toweling paper stocks and as wet and dry strength additives for all paper types including liner board. Typical cationic and cationogenic groups include the diethylaminoethyl ether groups introduced by reaction with 2-diethylaminoethylchloride hydrochloride or 3-(trimethyl ammonium chloride)-2-hydroxypropyl ether groups introduced by reaction with 3-chloro-2-hydroxypropyl trimethylammonium chloride.

DESCRIPTION OF THE PREFERRED EMBODIMENTS

When the polysaccharide is starch, applicable starch bases which may be used herein may be derived from any plant source including corn, potato, sweet potato, wheat, rice, sago, tapioca, waxy maize, sorghum, high amylose corn, or the like. Starch flours may also be used as a starch source. Also included are the conversion products derived from any of the former bases including, for example, dextrins prepared by the hydrolytic action of acid and/or heat; oxidized starches prepared by treatment with oxidants such as sodium hypochlorite; fluidity or thin-boiling starches prepared by enzyme conversion or mild acid hydrolysis; and derivatized and crosslinked starches. The starch base may be a granular starch (i.e., a birefringent starch or a non-birefringent starch with a substantially intact granular shell) or a gelatinized starch.

When the polysaccharide is gum, applicable bases which may be used herein are polygalactomannas, which are heteropolysaccharides composed principally of long chains of 1→4 β-D-mannopyranosyl units to which single unit side chains of α-D-galactopyranosyl units are joined by 1→6 linkages and hereafter referred to as "gums". Also included are degraded gum products resulting from the hydrolytic action of acid, heat, shear, and/or enzyme; oxidized gums; and derivatized gums. The preferred gums include gum arabic, as well as guar gum and locust bean gum because of their commercial availability.

When the polysaccharide is cellulose, applicable bases useful herein include cellulose and cellulose derivatives, especially water-soluble cellulose ethers such as alkyl and hydroxyalkylcelluloses, specifically methylcellulose, hydroxypropylmethyl cellulose, hydroxybutylmethylcellulose, hydroxyethylmethylcellulose, and ethylhydroxyethylcellulose.

Methods for preparing the modified polysaccharide bases are well-known to those skilled in the art and discussed in the literature. See, for example, R. L. Whistler, Methods in Carbohydrate Chemistry, Vol. IV, 1964, pp. 279-311; R. L. Whistler et al., Starch-Chemistry and Technology, Vol. II, 1967, pp. 293-430; R. L. Davidson and N. Sittig, Water-Soluble Resins, 2nd Ed., 1968, Chapter 2; and R. L. Davison, Handbook of Water-Soluble Gums and Resins, 1980, Chapters, 3, 4, 12 and 13 directed to cellulose derivatives, Chapters 6 and 14 directed to gums, and Chapter 22 directed to starch.

The starch reactions with the derivatizing reagents that introduce the acetal groups are carried out using the general procedure described in U.S. Pat. No. 3,728,332 issued Apr. 17, 1973 to M. M. Tessler et al. Granular reactions are typically carried out in water at 20°-50° C., preferably about 20°-40° C. Non-granular starch reactions may be carried out at higher temperatures (e.g., up to 180° C.). The reaction mixture is preferably agitated. Reaction time may vary from about 1-72 hours, preferably 8-16 hours for aqueous reactions or from about 1-8 hours for reactions carried out in a substantially dry reaction medium. It will depend on such factors as the amount of reagent employed, the temperature, the scale of the reaction, and the degree of substitution desired. The pH is conveniently controlled by the periodic addition of a dilute aqueous solution of hydrochloric acid, but other common acids, such as sulfuric or acetic, may also be used with equal success. Aqueous suspensions are preferred, but the reaction may be carried out, if desired, in a non-aqueous system by suspending the starch base in any common organic solvent as, for example, p-dioxane, toluene, dichloromethane, and the like, and then adding the derivatizing reagent.

The gum reactions with the acetal reagents are carried out using the general procedure described in U.S. Pat. No. 4,540,778 issued Sept. 10, 1985 to M. Tessler et al. The reaction is carried out in a two-phase reaction system comprising an aqueous solution of a water-miscible solvent and the water-soluble reagent in contact with the solid gum. The water content may vary from 10 to 60% by weight depending upon the water-miscible solvent selected. If too much water is present in the reaction system, the gum may swell or enter into solution thereby complicating recovery and purification of the derivative. The water-miscible solvent is added in the amount sufficient for the preparation of a slurry which can be agitated and pumped. The weight ratio of water-miscible solvent to gum may vary from 1:1 to 10:1, preferably from 1.5:1 to 5:1. Suitable water-miscible solvents include alkanols, glycols, cyclic and acylic alkyl ethers, alkanones, dialkylformamide and mixtures thereof. Typical solvents include methanol, ethanol, isopropanol, secondary pentanol, ethylene glycol, acetone, methylethylketone, diethylketone, tetrahydrofuran, dioxane, and dimethylformamide. The reaction is carried out at about 20°-45° C., preferably ambient temperature (about 25° C.) for about 3-16 hours, depending on such factors as the amount of reagent employed, the temperature, the scale of the reaction, and the degree of substitution. The pH is maintained at about 7.5 during the reagent addition and during the entire reaction using a base, such as sodium hydroxide, calcium hydroxide, and the like, in the mixed water/solvent system. After completion of the reaction the excess alkali is neutralized and the pH is adjusted to about 5.5 with an acid, such as hydrochloric acid, sulfuric acid, acetic acid and the like, conveniently added as a dilute solution.

The cellulose reactions with the acetal reagents are conveniently carried out using the procedure of U.S. Pat. No. 4,129,722 (issued Dec. 12, 1978 to C. P. Iovine et al.). The cellulose or cellulose derivative is suspended in an organic solvent and a water solution of the derivatizing reagent is added thereto. Derivatization in the resultant two-phase mixture is ordinarily carried out with agitation at temperatures of 30° to 85° C., adding alkali if necessary to effect reaction. At least one of the initial phases (i.e., the suspended cellulose or cellulose derivative or the aqueous reagent solution) contains a suitable surfactant. It is important that the organic solvent used in the initial cellulose phase be immiscible with the aqueous derivatizing reagent phase, that it not dissolve the cellulose derivative as it is formed, that it have a boiling point at or above the temperature of the derivatizing reaction, that it be insensitive to alkali and not participate in the derivatization reaction.

The two phase procedure may also be used to prepare starch and gum derivatives as well as cellulose derivatives. It may also be used to prepare derivatives containing substituents derived from different reagents without isolating the substitution production from each reagent. This multiple substitution may be accomplished by the addition of several different reagents to the substrate-surfactant alkali mixture at the same time or sequentially.

After completion of the derivatization reaction the solid acetals may be separated, if desired, from the reaction mixture by centrifugation or filtration. Preferably, the derivative is purified by washing with water in the case of the starch derivatives, with the aqueous solution of water-miscible solvent in the case of the gum derivatives or with the solvent in the case of the cellulose derivatives. Further washing with a more anhydrous form of the same solvent may be desirable for the gum derivatives. The derivatives are then dried using conventional methods, as in a vacuum, drum, flash, belt, or spray drier.

The conversion of the polysaccharide acetals to the corresponding polysaccharide aldehydes is carried out by aqueous treatment at a pH less than 7, preferably 2-4. It may be carried out directly without isolation of the acetal or the acetal may be isolated as above and resuspended in water prior to conversion. If desired, the derivatives may be recovered as described above.

In addition to preparing the above acetals, or aldehydes, modified derivatives may be prepared which contain other substituent groups such as, hydroxylalkyl groups (e.g., hydroxypropyl ether groups), carboxyalkyl ether groups (e.g., carboxymethyl), ester groups (e.g., acetate groups), tertiary amino groups (e.g., dimethylaminoethyl ether groups), and quaternary amine groups (e.g., 3-(trimethylammonium chloride)-2-hydroxypropyl groups or 4-(trimethylammonium chloride)2-butenyl groups), introduced prior to or subsequent to reaction with the acetal derivatizing reagent or introduced simultaneously by reaction with the acetal reagent and other derivatizing reagent.

The aldehyde derivatives used as paper additives preferably contain cationic (e.g., the quaternary ammonium and tertiary amine group discussed above), amphoteric, and/or zwitterionic groups. These derivatives are dispersed in water before use. The granular starch derivatives are cooked to provide the dispersed derivative.

The starch may be cooked prior to derivatization to form the acetal, subsequent to derivatization, after conversion to the aldehyde, or most conveniently during conversion of the acetal to the aldehyde. Cooking at pH 7 or less simultaneously converts the acetal to aldehyde and solubilizes and disperses the starch aldehyde. Any conventional cooking procedure may be used, such as cooking a slurry containing the water-soluble or water-swellable derivative in a boiling water bath for about 20 minutes, blowing in steam to heat the slurry to about 93° C. (200° F.), or jet cooking. If a water-dispersible or water-soluble starch base is used for the preparation of the acetal, it will not be necessary to cook the acetal during the acid hydrolysis.

The aldehyde derivatives described herein may be used as beater additives, although their addition to the pump may occur at any point in the paper-making process prior to the ultimate conversion of the wet pulp into a dry web or sheet. Thus, for example, they may be added to the pulp while the latter is in the hydropulper, beater, various stock chests, or headbox. The derivatives may also be sprayed onto the wet web. If the derivative is trapped in the wet fibers after spraying, it may not be necessary to use cationic aldehyde derivatives but they are preferred.

The aldehydes herein may be effectively used for addition to pulp prepared from any type of cellulosic fibers, synthetic fibers, or combinations thereof. Among the cellulosic materials which may be used are bleached and unbleached sulfate (kraft), bleached and unbleached sulfite, bleached and unbleached soda, neutral sulfite, semi-chemical chemiground wood, ground wood or any combination of these fibers. Fibers of the viscous rayon or regenerated cellulose type may also be used if desired.

Any desired inert mineral fillers may be added to the pulp which is to be modified with the aldehydes herein. Such materials include clay, titanium dioxide, talc, calcium carbonate, calcium sulfate and diatomaceous earths. Rosin or synthetic internal size may also be present if desired.

The proportion of the aldehyde to be incorporated into the paper pulp may vary in accordance with the particular pulp involved and the properties desired (e.g., wet strength, temporary wet strength, or dry strength). In general, it is preferred to use about 0.1–10% preferably about 0.25–5% of the derivative, based on the dry weight of the pulp. Within this preferred range the precise amount which is used will depend upon the type of pulp being used, the specific operating conditions, the particular end use for which the paper is intended, and the particular property to be imparted. The use of amounts greater than 5%, based on the dry weight of the pulp, is not precluded, but is ordinarily unnecessary in order to achieve the desired results.

The preparation of acylguanidines of monocarboxylic acids is described in U.S. Pat. No. 2,408,694 issued Oct. 1, 1946 to J. K. Simons et al. The novel 3,3-dialkoxypropionyl guanidine herein is prepared by reaction of the appropriate dialkoxy ester with guanidine in ethanol.

It can be appreciated by the practitioner that a large number of variations may be effected in selecting the acetal derivatizing reagents, reacting them with the bases, converting them to the aldehydes, and utilizing the aldehyde derivatives as wet end additives for paper in accordance with the procedure described above without materially depending from the scope and spirit of the invention. Such variations will be evident to those skilled in the art and are to be included within the scope of the invention.

In the examples which follow, all parts and percentages are given by weight and all temperatures are in degrees Celsius unless otherwise noted. Reagent percentages are based on dry polysaccharide. The nitrogen content of the cationic bases and resulting acetals was measured by the Kjeldahl method and are based on dry polysaccharide. The presence of aldehyde groups was determined qualitatively by the viscosity increase of a cookedslurry and/or gel formation and quantitatively by titration. The quantitative test is carried out by slurrying 5.0 g of the polysaccharide acetal in sufficient distilled water to give 500 g. The pH is adjusted to 2.5 with hydrochloric acid. The polysaccharide is dispersed by cooking in a boiling water bath for 20 minutes. The dispersed polysaccharide is cooled and the solids determined. A 100 g. portion of the dispersed polysaccharide is weighed out, titrated with 0.1 NaOH to the first end point (inflection point is between pH 4.0 and 5) and the ml. of NaOH required is recorded ($T_1$). An aqueous solution (50 ml.) of hydroxylamine hydrochloride (prepared by dissolving 34.75 g. in 1000 ml. volumetric flask and diluting to the mark) is added to a 100 g. portion of the dispersed polysaccharide, heated at reflux for 60 minutes, and titrated with 0.1N NaOH to pH 4.5. The ml. of NaOH required to reach the inflection point (pH 3.0–3.5) is recorded ($T_2$).

$$\% \text{ aldehyde} = \frac{(T_2 - T_1) \times (\text{normality of NaOH}) \times (2.9)}{\text{polysaccharide weight}^*}$$

*polysaccharide weight=100 g.×% solids of dispersed polysaccharide

Best results are obtained using an automatic titrator. A blank using the base polysaccharide (i.e., unmodified by the introduction of acetal groups) may also be run.

EXAMPLE I

This example describes the preparation of a starch ester acetal and aldehyde by reacting 3,3-diethoxy propionyl guanidine with corn starch and then converting the acetal to the aldehyde. The reaction was conducted in an aqueous medium.

Part A—Preparation of 3,3,-Diethoxypropionyl Guanidine

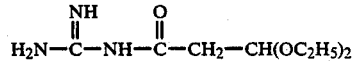

A total of 1.05 g. (0.011 mole) of guanidine hydrochloride was stirred into a sodium ethoxide solution (0.25 g. sodium in 5 ml. anhydrous ethanol). The sodium chloride precipitate that formed was removed by centrifuging the reaction mixture and decanting off the clear guanidine solution. The solution was mixed with 2.09 g. (0.011 mole) of ethyl 3,3-diethoxy propionate and stirred overnight. The ethanol was removed by a rotary evaporator to give 2 g. of a clear oil which turned into a white wax-like solid after standing for several days. The product was characterized by ¹H NMR in $D_2O$.

Part B—Reaction of 3,3-Diethoxypropionyl Guanidine with Corn Starch

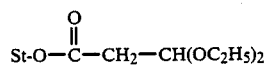

A total of 40 g. of corn starch was slurried in water (60 ml.) and 4.87 g. (as is) of 3,3-diethoxypropionyl guanidine (82% active by nitrogen analysis) were added to the slurry. The pH of the reaction mixture was maintained at 7.5 by the addition of 0.5N hydrochloric acid. The mixture was stirred for 16 hours at 45° C. The reaction efficiency (based on HCl consumed) was 39%.

The resulting acetal was isolated by filtering the slurry, washing with water at pH 7.6 three times, and air-drying. The resulting derivative was cooked in water at 8% solids to give a soft set with a smooth texture.

Part C—Conversion of The Starch Acetal to The Aldehyde

The starch acetal from part B was cooked in water at pH 2.4. The starch gelled into a heavy set while cooking. The derivative contained 0.62% aldehyde by titration. Ester analyses showed there was 1.62% of the reagent on the starch (27.6% reaction efficiency). Nitrogen analysis (0.046%) showed there was very little residual unreacted starting material in the starch aldehyde.

EXAMPLE II

This example describes the preparation of another corn starch acetal and aldehyde using 4-(methylaminoacetaldehyde dimethyl acetal)-4-oxobutanoic acid for reaction with the starch. The reaction was of the dry heat type and used no suspending medium.

Part A—Preparation of 4-(Methylaminoacetaldehyde dimethyl acetal)-4-oxo-butanoic Acid

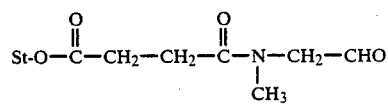

A total of 20.01 g. (0.20 mole) of succinic anhydride was charged to a reaction flask containing 135 ml. of toluene. Over 35 minutes 23.83 g. (0.20 mole) of methylaminoacetaldehyde dimethyl acetal was added. The reaction mixture was maintained at or below 30° C. during the addition by adjusting the addition rate. The mixture was stirred 1 hour at 50° C. to insure complete reaction and then cooled and concentrated on the rotary evaporator. The crude product (47.71 g.) was a viscous yellow oil. It contained 5.86% N (6.38% theoretical).

Part B—Reaction of 4-(Methylaminoacetaldehyde dimethyl acetal)-4-oxo-butanoic Acid with Corn Starch

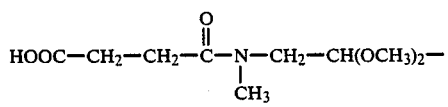

A total of 2.7 g. (as is) of the above acetal (91.8% active) was dissolved in about 5 ml. of water and added dropwise to 25 g. (dry basis) of dry corn starch. The impregnated powder starch was placed in a flask which was heated in an oil bath to 95°–100° C. with stirring for 16 hours.

The product was isolated by allowing the starch to cool to room temperature and then slurrying it in a 50/50 methanol/water mixture. The slurry pH was adjusted to 7.5 and filtered. The product was washed four times with 100 ml. of water and air-dried. The resulting starch product was cooked at 8% solids in water to give a stable dispersion with a medium viscosity and a smooth texture.

Part C—Conversion of The Starch Ester Acetal to The Aldehyde

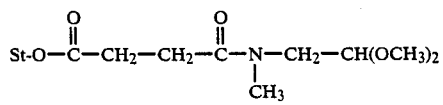

The starch product was cooked at pH 2.5. The cook was also stable but with a thinner viscosity and some lumps. Ester analysis showed 2.18% reagent on the starch. The N content was 0.144% indicating a reaction efficiency of 24.5%.

EXAMPLE III

This example describes the preparation of a cellulose ester acetal and aldehyde using the reagent of Example II. The reaction was a dry heat type.

A total of 10 g. of cellulose was slurried in a solution containing 1 g. of 4-methyl amino acetaldehyde dimethyl acetal-4-oxo-butanoic acid (10 wt. % treatment) in 60 ml. of acetone. The acetone was stripped off to give the dry material which was heated 16 hours at 120°–125° C. in a sealed jar. The resulting material was slurried in 150 ml. of water, the pH was raised to 7.5 with 1N sodium hydroxide. The resulting cellulose acetal was recovered by filtration, washed four times with 200 ml. of water and twice with 150 ml. of acetone. It was reslurried in water twice and filtered. The product was a tan fluffy solid having a N content of 0.123% (21.1% efficiency).

The above procedure was repeated with 100 wt. % treatment. The resulting cellulose acetal contained 0.204% N (6.35% reaction efficiency).

Conversion to the cellulose ester aldehyde was carried out at pH 2.5.

EXAMPLE IV

The following experiment shows the hydrolytic stability of an ester linkage at the pH used for converting the acetal groups to aldehyde groups.

A control of 5 g. dry basis (DB) of a starch acetate (waxy corn starch, 1.685% acetate) was slurried in 250 g. of distilled water. The pH was then adjusted to the indicated value with 30% hydrochloric acid, and the slurry was heated to 95° C. with occasional stirring for 20 minutes. The cooked sample was then cooled and the amount of acetate remaining was measured by the standard saponification method. The results are shown in Table I.

TABLE I

| | ESTER HYDROLYSIS | |
|---|---|---|
| pH | Net Acetate (%) | Acetate Remaining (%) |
| 0.48 | 0.53 | 31.52 |

TABLE I-continued

ESTER HYDROLYSIS

| pH | Net Acetate (%) | Acetate Remaining (%) |
|---|---|---|
| 0.62 | 0.85 | 50.25 |
| 1.00 | 1.10 | 65.33 |
| 1.22 | 1.36 | 80.74 |
| 1.53 | 1.63 | 96.78 |
| 1.77 | 1.68 | 100.15 |
| 2.32 | 1.68 | 99.64 |
| 2.54 | 1.63 | 96.97 |
| 3.03 | 1.69 | 100.34 |
| 6.03 | 1.73 | 102.99 |
| 9.70 | 0.04 | 2.38 |

Little or no hydrolysis of the ester (i.e., acetate) function takes place within the pH range 1.5 to above 6 thus indicating the ester group is stable at the pH preferred for converting the acetal groups to aldehyde groups, i.e., pH 2-4.

EXAMPLE V

The following chart (A) shows a list of acetal-containing derivatizing reagents which can be reacted with polysaccharides such as starch, gum, and cellulose, using the procedures indicated, to give a polysaccharide ester containing acetal groups.

EXAMPLE VI

The following chart (B) shows a list acetal-containing derivatizing reagents which can be reacted with polysaccharides such as starch, gum, and cellulose, using the procedures indicated, to give a crosslinked polysaccharide ester containing acetal groups which can then be converted to aldehyde groups.

In summary, the present invention is seen to provide polysaccharide esters containing aldehyde groups, which are generally useful for imparting strength to paper, as well as the corresponding polysaccharide acetals.

CHART A

| REAGENT | REACTION PROCEDURE | POLYSACCHARIDE ACETAL |
|---|---|---|
| Br—C(=O)—C₆H₄—CH—(OCH₃)₂ <br> 4-Dimethoxymethyl benzoic acid bromide | C | Sacch-O—C(=O)—C₆H₄—CH—(OCH₃)₂ |
| Phthalic anhydride with —C(=O)—N(CH₂CH—(OCH₃)₂)₂ substituent <br> Amide of Di(2,2-dimethoxyethyl)amine and trimellitic acid chloride anhydride | A | Sacch-O—C(=O)—C₆H₃(COOH)—C(=O)—N(CH₂—CH—(OCH₃)₂)₂ <br> and/or <br> Sacch-O—C(=O)—C₆H₃—C(=O)—N(CH₂—CH—(OCH₃)₂)₂ with HOOC— |
| O=C=N—CH₂—CH—(OCH₃)₂ <br> 2,2-Dimethoxyethyl isocyanate | A | Sacch-O—C(=O)—NH—CH₂—CH—(OCH₃)₂ |
| HO—C(=O)—[benzo-1,3-dioxolane] <br> Benzo-1,3-dioxolane-2-carboxylic acid | B | Sacch-O—C(=O)—[benzo-1,3-dioxolane] |
| CH₃C(=O)—O—C(=O)—CH=CH—CH₂—N(CH₂—CH₂—CH—(OCH₃)₂)₂ <br> Acetic 4-(bis-(3,3-dimethoxypropyl)4-amine)-but-2-enoic anhydride | A | Sacch-O—C(=O)—CH=CH—CH₂—N(CH₂—CH₂—CH—(OCH₃)₂)₂ |
| N≡C—CH₂CH₂—CH(O—CH₂—CH₂—O) <br> 3-Cyanopropionaldehyde ethylene acetal | D | Sacch-O—C(=O)—CH₂—CH₂—CH(O—CH₂—CH₂—O) |

CHART A -continued

| REAGENT | REACTION PROCEDURE | POLYSACCHARIDE ACETAL |
|---------|--------------------|-----------------------|
| 3-carbamide-benzaldehyde dihexyl acetal $$H_2N-\overset{O}{\underset{\|}{C}}-\underset{\text{(ring)}}{}-CH-(O(CH_2)_5CH_3)_2$$ | D | $$Sacch-O-\overset{O}{\underset{\|}{C}}-\underset{\text{(ring)}}{}-CH-(O(CH_2)_5-CH_3)_2$$ |
| 4,4-Diisopropoxybut-2-ynoic acid chloride $$Cl-\overset{O}{\underset{\|}{C}}-C\equiv CH-CH-(O-CH(CH_3)_2)_2$$ | C | $$Sacch-O-\overset{O}{\underset{\|}{C}}-CH\equiv CH-CH-(O-CH(CH_3)_2)_2$$ |
| 6,6-Dimethoxy-2-thio-hexene ketene $$O=C=CH-CH_2-S-CH_2-CH-(OCH_3)_2$$ | B | $$Sacch-O-\overset{O}{\underset{\|}{C}}-CH_2-CH_2-S-CH_2-CH-(OCH_3)_2$$ |
| Ethyl 2-methoxy-2-propoxy acetate $$CH_3-CH_2O-\overset{O}{\underset{\|}{C}}-\underset{\overset{\|}{CH}}{}\overset{OC_3H_7}{\underset{OCH_3}{}}$$ | B | $$Sacch-O-\overset{O}{\underset{\|}{C}}-\underset{\overset{\|}{CH}}{}\overset{OC_3H_7}{\underset{OCH_3}{}}$$ |

Reaction Procedure A: Water/acetone as solvent, pH 7-8, 25 to 45° C.
Reaction Procedure B: Dry powder (0-15% moisture), pH 3-7, 90 to 130° C.
Reaction Procedure C: Toluene as solvent, 1-4 equivalents pyridine, −10 to 110° C.
Reaction Procedure D: Toluene or no solvent (i.e., neat), excess strong acid, 40-120° C.

CHART B

| REAGENT | REACTION PROCEDURE | POLYSACCHARIDE ACETAL |
|---|---|---|
| 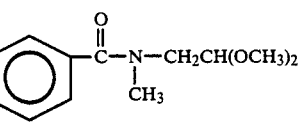<br>Amide of 3,4-dicarbomethoxy benzoic acid chloride and methyl aminoacetaldehyde dimethyl acetal | B | 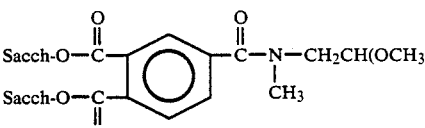 |
| 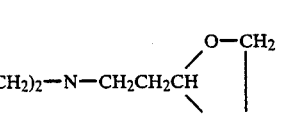 | B | 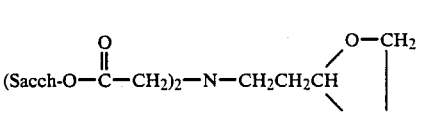 |
| 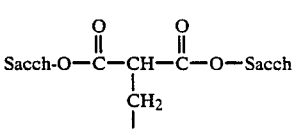<br>Bis-acetic anhydride of 2-(2',2'-dimethoxyethyl)-malonic acid | A | 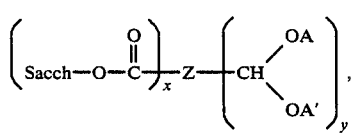 |

Reaction Procedure A: Water/acetone as solvent, pH 7-8, 25 to 45° C.
Reaction Procedure B: Dry powder (0–15% moisture), pH 3–7, 90 to 130° C.

Now that the preferred embodiments of the invention have been described in detail, various modifications and improvements thereon will become readily apparent to those skilled in the art. Accordingly, the spirit and scope of the present invention are to be limited only by the appended claims and not by the foregoing specification.

What is claimed is:

1. A polysaccharide ester having the structure

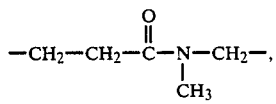

wherein Sacch-O- represents a polysaccharide molecule, Z is a multivalent organic group, A and A' are independently a lower alkyl or A and A' form a cyclic acetal containing at least 5-members, x is at least 1, and y is at least 1.

2. The ester of claim 1, wherein Z contains a monovalent substituent selected from the group consisting of an alkyl, ether, carbonyl, ester, amide, amine, thioalkyl, sulfonate, and sulfate.

3. The ester of claim 1, wherein the polysaccharide is a starch, a gum, or a cellulose, Z is a divalent group, and A and A' are methyl or ethyl groups.

4. The ester of claim 3, wherein Z is —CH$_2$—, the polysaccharide is a starch, or a cellulose, and A and A' are ethyl groups.

5. The ester of claim 3, wherein Z is $$-CH_2-CH_2-\overset{O}{\overset{\|}{C}}-\underset{\underset{CH_3}{|}}{N}-CH_2-,$$

the polysaccharide is a starch, and A and A' are methyl groups.

6. The ester of claim 1 wherein

Z is 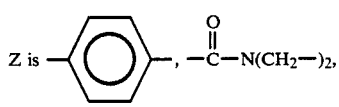

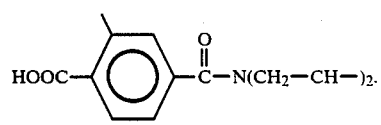

7. An aldehyde-containing polysaccharide ester having the structure

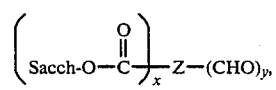

which is prepared by hydrolyzing, at a pH of less than about 7, an acetal-containing polysaccharide which is prepared by reacting a polysaccharide, at a pH of about 7 or above, with an acetal-containing reagent having the structure

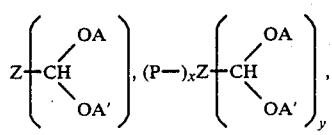

wherein Sacch-O- represents a polysaccharide molecule, Z is a multivalent organic group and P is a group capable of reacting with a hydroxyl group of the polysaccharide molecule to form an ester derivative, which group is an activated acyl group selected from the group consisting of an acid chloride, an imidazolium, an isocyanate, an anhydride, and a vinyl ester or a non-activated acyl group selected from the group consisting of an acid, an acid salt, and an ester, A and A' are independently a lower alkyl or A and A' form a cyclic acetal containing at least 5 members, x is at least 1, and y is at least 1.

8. The ester of claim 1, where in the pH is about 5 or less during the hydrolysis and at about 7.5 during the polysaccharide reaction.

9. The ester of claim 8, wherein the pH is about 2–3 during the hydrolysis.

* * * * *